(12) United States Patent
Shibuki et al.

(10) Patent No.: US 11,333,089 B2
(45) Date of Patent: May 17, 2022

(54) SUPERCHARGING PRESSURE CONTROL DEVICE FOR INTERNAL COMBUSTION ENGINE

(71) Applicant: Honda Motor Co., Ltd., Tokyo (JP)

(72) Inventors: Katsuaki Shibuki, Saitama (JP);
Katsushi Hashimoto, Saitama (JP);
Satoshi Moriyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/195,559

(22) Filed: Mar. 8, 2021

(65) Prior Publication Data

US 2021/0293192 A1 Sep. 23, 2021

(30) Foreign Application Priority Data

Mar. 18, 2020 (JP) .............................. JP2020-047215

(51) Int. Cl.
*F02D 41/00* (2006.01)
*F02B 37/22* (2006.01)
*F02M 31/20* (2006.01)

(52) U.S. Cl.
CPC ........ *F02D 41/0007* (2013.01); *F02B 37/225* (2013.01); *F02M 31/20* (2013.01); *F02D 2200/0414* (2013.01); *F02D 2200/501* (2013.01)

(58) Field of Classification Search
CPC . F02D 41/0007; B60K 6/48; B60L 2240/423; B60L 2240/443; B60W 10/06;
(Continued)

(56) References Cited

U.S. PATENT DOCUMENTS 6,105,554 A * 8/2000 Nishiyama ............... F02D 41/12
123/436
6,293,757 B1 * 9/2001 Oda ................... F02M 63/0225
417/53

(Continued)

FOREIGN PATENT DOCUMENTS

| JP | 2015078637 | 4/2015 |
| JP | 2015175329 | 10/2015 |
| JP | 2017008724 | 1/2017 |

OTHER PUBLICATIONS

"Office Action of Japan Counterpart Application", dated Nov. 24, 2021, with English translation thereof, p. 1-p. 8.

*Primary Examiner* — John Kwon
(74) *Attorney, Agent, or Firm* — JCIPRNET

(57) ABSTRACT

The disclosure provides a supercharging pressure control device for an internal combustion engine that may suppress misfires of the internal combustion engine caused by a large amount of condensed water and freezing of an intercooler and suppress the decrease in supercharging response under the conditions that such problems are unlikely to occur. The supercharging pressure control device for the internal combustion engine includes a supercharger (turbocharger), an intercooler, a supercharging pressure control part controlling a supercharging pressure based on a target supercharging pressure, and an intake air temperature acquisition part (intake air temperature sensor) acquiring a temperature of the intake air as an intake air temperature, and executes a supercharging pressure reduction control when the intake air temperature is greater than or equal to a specified first threshold temperature or less than or equal to a specified second threshold temperature less than the first threshold temperature.

6 Claims, 3 Drawing Sheets

(58) Field of Classification Search
CPC ......... B60W 10/08; B60W 2510/0657; B60W 2510/0671
See application file for complete search history.

(56) References Cited

U.S. PATENT DOCUMENTS

| | | | |
|---|---|---|---|
| 6,446,610 B1* | 9/2002 | Mazet | F02D 41/3818 123/357 |
| 2008/0025849 A1* | 1/2008 | Okamoto | F02D 41/3845 417/213 |
| 2014/0251275 A1* | 9/2014 | Lana | F02D 41/0085 123/452 |
| 2015/0198081 A1* | 7/2015 | Surnilla | F02D 41/3854 123/294 |
| 2018/0320627 A1* | 11/2018 | Hoshi | F02D 19/0636 |
| 2019/0063356 A1* | 2/2019 | Hoshi | F02D 35/02 |

* cited by examiner

SUPERCHARGING PRESSURE CONTROL DEVICE FOR INTERNAL COMBUSTION ENGINE

CROSS-REFERENCE TO RELATED APPLICATION

This application claims the priority benefits of Japanese application no. 2020-047215, filed on Mar. 18, 2020. The entirety of the above-mentioned patent application is hereby incorporated by reference herein and made a part of this specification.

TECHNICAL FIELD

The disclosure relates to a supercharging pressure control device for an internal combustion engine equipped with a supercharger.

DESCRIPTION OF RELATED ART

In an internal combustion engine of an automobile or the like equipped with a supercharger, the supercharging pressure is increased by compressing the intake air with a compressor, thereby increasing the output. When the supercharging pressure is increased, the temperature of the compressed intake air rises accordingly, and such a rise in the intake air temperature becomes the cause of abnormal combustion such as knocking. Therefore, conventionally, an intercooler is provided in the intake air passage to cool the intake air.

When the intake air is cooled by an intercooler, condensed water may occur inside or on the downstream side of the intercooler. Since such an occurrence of condensed water becomes the cause of the corrosion of the intercooler and the damage to the internal combustion engine resulting from the occurrence of water hammer and the like, it is desirable to securely prevent it.

In view of such a problem, for example, in the control device for the internal combustion engine described in Patent Document 1, the humidity of the intake air sucked into the combustion chamber of the internal combustion engine is detected, and the supercharging pressure is controlled to be lowered in the case that the humidity is high so as to suppress the occurrence of condensed water.

[Patent Document 1] Japanese Laid-open Publication No. 2015-78637

In the case that the intake air is in a state of high temperature and high humidity, by cooling a large amount of water existing in the intake air with an intercooler, the possibility of condensed water occurring inside or on the downstream side of the intercooler increases. At the time, if a large amount of the occurring condensed water is taken into the combustion chamber of the internal combustion engine at one time by the supercharging pressure raised by a supercharger, a misfire is likely to occur. In addition, in the case that the intake air is in a state of low temperature and high humidity, a large amount of water in the intake air may condense due to being excessively cooled by the intercooler and may freeze inside or on the downstream side of it.

Regarding this, in the technique of Patent Document 1, since the supercharging pressure is controlled based on the humidity of the intake air without considering the temperature of the intake air, it is difficult to prevent the occurrence of condensed water under the conditions of high temperature and high humidity or the conditions of low temperature and high humidity as described above.

SUMMARY

A supercharging pressure control device for an internal combustion engine according to a first aspect of the disclosure includes a supercharger 12 compressing an intake air of the internal combustion engine (engine 1 in the embodiment; hereinafter the same shall apply in this section) equipped in a vehicle by a compressor 123 and performing supercharging, an intercooler 3 cooling the intake air compressed by the compressor 123, a supercharging pressure control means (ECU 20) controlling a supercharging pressure PB generated by the supercharger 12 based on a target supercharging pressure PBCMD set based on a requirement of the vehicle, and an intake air temperature acquisition part (intake air temperature sensor 23) acquiring the temperature of the intake air on the upstream side of the compressor 123 as an intake air temperature TI. The supercharging pressure control part executes a supercharging pressure reduction control that reduces the supercharging pressure PB to a value less than the target supercharging pressure PBCMD in the case that the acquired intake air temperature TI is greater than or equal to a specified first threshold temperature TTHR1 or less than or equal to a specified second threshold temperature TTHR2 less than the first threshold temperature TTHR1 (steps 301, 302 and 306 in FIG. 3), and prohibits the execution of the supercharging pressure reduction control in the case that the intake air temperature is less than the first threshold temperature TTHR1 and greater than the second threshold temperature TTHR2 (steps 301, 302 and 307).

DESCRIPTION OF THE EMBODIMENTS

Figure 1:
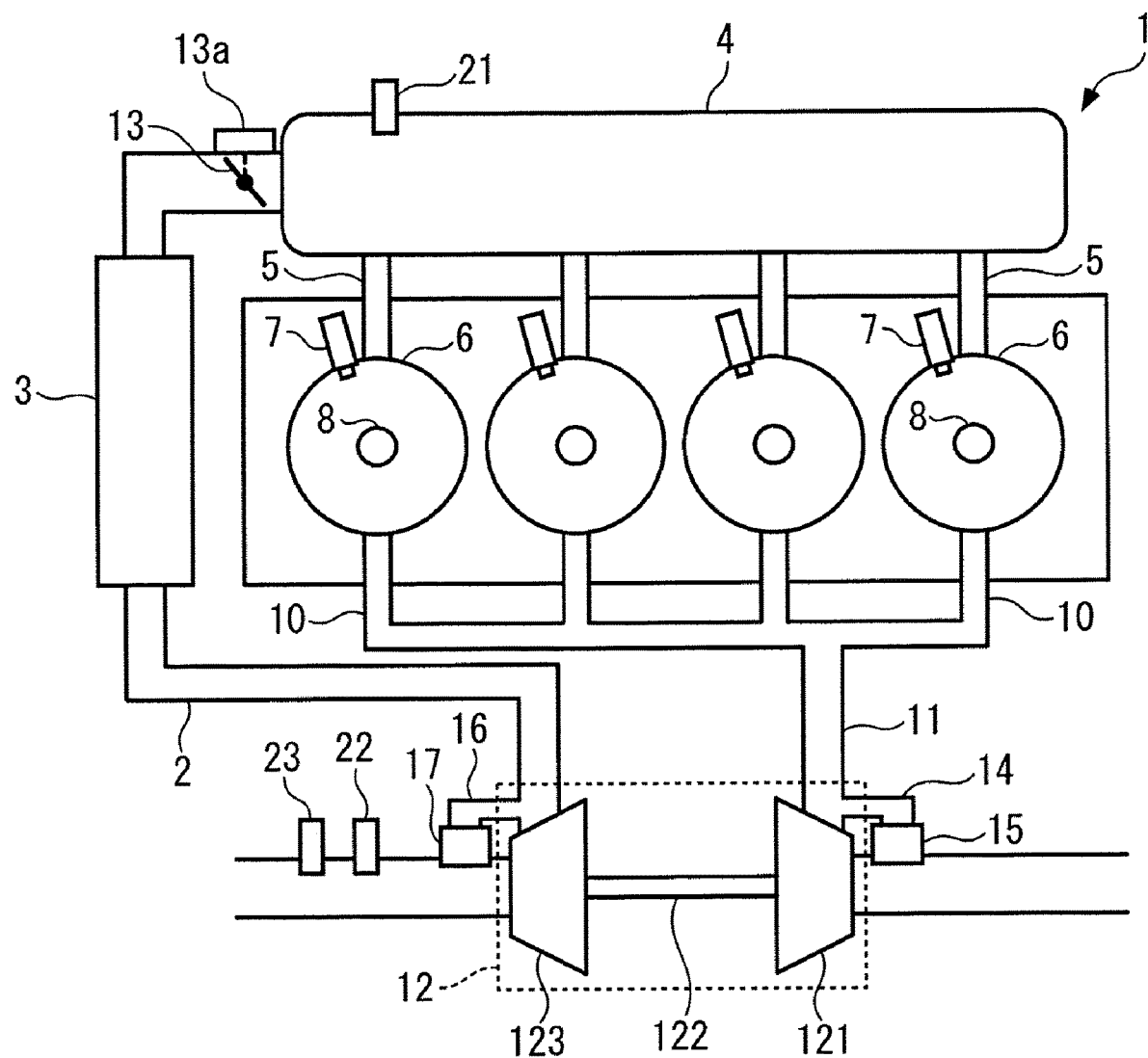
FIG. 1 is a diagram schematically showing a configuration of an internal combustion engine.

Accordingly, the disclosure provides a supercharging pressure control device for an internal combustion engine that may suppress misfires of the internal combustion engine and freezing of the intercooler caused by the occurrence of a large amount of condensed water, and may also suppress the decrease in supercharging response under the conditions that such problems are unlikely to occur.

A supercharging pressure control device for an internal combustion engine according to a first aspect of the disclosure includes a supercharger 12 compressing an intake air of the internal combustion engine (engine 1 in the embodiment; hereinafter the same shall apply in this section) equipped in a vehicle by a compressor 123 and performing supercharging, an intercooler 3 cooling the intake air compressed by the compressor 123, a supercharging pressure control means (ECU 20) controlling a supercharging pressure PB generated by the supercharger 12 based on a target supercharging pressure PBCMD set based on a requirement of the vehicle, and an intake air temperature acquisition part (intake air temperature sensor 23) acquiring the temperature of the intake air on the upstream side of the compressor 123 as an intake air temperature TI. The supercharging pressure control part executes a supercharging pressure reduction control that reduces the supercharging pressure PB to a value less than the target supercharging pressure PBCMD in the case that the acquired intake air temperature TI is greater than or equal to a specified first threshold temperature TTHR1 or less than or equal to a specified second threshold temperature TTHR2 less than the first threshold temperature TTHR1 (steps 301, 302 and 306 in FIG. 3), and prohibits the execution of the supercharging pressure reduction control in the case that the intake air temperature is less than the first threshold temperature TTHR1 and greater than the second threshold temperature TTHR2 (steps 301, 302 and 307).

According to the configuration, the supercharging pressure control part executes the supercharging pressure reduction control that reduces the supercharging pressure to a value less than the target supercharging pressure in the case that the acquired intake air temperature is greater than or equal to the specified first threshold temperature or less than or equal to the specified second threshold temperature less than the first threshold temperature.

In this way, under the specified high temperature conditions that a large amount of condensed water is likely to occur inside or on the downstream side of the intercooler when the humidity is high, or under the specified low temperature conditions that freezing is likely to occur inside or on the downstream side of the intercooler when the humidity is high, the supercharging pressure reduction control is executed to reduce the supercharging pressure to a value less than the target supercharging pressure. As a result, by the reduction in intake air flow resulting from supercharging, it is possible to suppress misfires of the internal combustion engine caused by the suction of a large amount of condensed water and freezing of the inside or downstream side of the intercooler caused by excessive cooling. In addition, in the case that the above-mentioned temperature conditions are not satisfied, since the execution of the supercharging pressure reduction control is prohibited, it is possible to prevent the decrease in supercharging response under the conditions that a large amount of condensed water is unlikely to occur.

According to a second aspect of the disclosure, the supercharging pressure control device for the internal combustion engine according to the first aspect further includes a vehicle speed acquisition part (vehicle speed sensor 25) acquiring a vehicle speed VP that is the speed of the vehicle, and an intake air humidity parameter acquisition part (wiper sensor 26) acquiring an intake air humidity parameter that indicates the intake air humidity on the upstream side of the compressor 123. The supercharging pressure control part executes the supercharging pressure reduction control in the case that the intake air temperature TI is greater than or equal to the first threshold temperature TTHR1 or less than or equal to the second threshold temperature TTHR2, and the acquired vehicle speed VP is greater than or equal to a specified value VTHR, and the humidity indicated by the acquired intake air humidity parameter is greater than or equal to a specified value (steps 301 to 306), and prohibits the execution of the supercharging pressure reduction control in the case that the intake air temperature TI is less than the first threshold temperature TTHR1 and greater than the second threshold temperature TTHR2, or the vehicle speed VP is less than the specified value VTHR, or the humidity indicated by the intake air humidity parameter is less than the specified value (steps 301 to 305 and 307).

According to the configuration, the supercharging pressure control part executes the supercharging pressure reduction control in the case that the intake air temperature is greater than or equal to the specified first threshold temperature or less than or equal to the second threshold temperature less than the first threshold temperature, and the acquired vehicle speed is greater than or equal to the specified value, and the humidity indicated by the acquired intake air humidity parameter is greater than or equal to the specified value.

In this way, only in the case that the specified high or low temperature conditions, the specified high vehicle speed conditions, and the specified high humidity conditions are satisfied, is the supercharging pressure reduction control executed to reduce the supercharging pressure to a value less than the target supercharging pressure. As a result, it is possible to better obtain the effect of suppressing misfires of the internal combustion engine caused by the suction of a large amount of condensed water and freezing of the inside or downstream side of the intercooler caused by excessive cooling. In addition, in the case that one of the above-mentioned temperature conditions, vehicle speed conditions, and humidity conditions is not satisfied, since the execution of the supercharging pressure reduction control is prohibited, it is possible to prevent the decrease in supercharging response under the conditions that a large amount of condensed water is unlikely to occur.

According to a third aspect of the disclosure, in the supercharging pressure control device for the internal combustion engine according to the second aspect, the intake air humidity parameter is an operating signal of a wiper. The supercharging pressure control part executes the supercharging pressure reduction control in the case that the intake air temperature is greater than or equal to the first threshold temperature or less than or equal to the second threshold temperature, and the acquired vehicle speed is greater than or equal to the specified value, and the acquired operating signal of the wiper indicates a continuous operation of the wiper (steps 301 to 306), and prohibits the execution of the supercharging pressure reduction control in the case that the intake air temperature is less than the first threshold temperature and greater than the second threshold temperature, or the vehicle speed is less than the specified value, or the acquired operation signal of the wiper does not indicate the continuous operation of the wiper (steps 301 to 305 and 307).

According to the configuration, the intake air humidity parameter is the operating signal of the wiper, and the supercharging pressure control part executes the supercharging pressure reduction control in the case that the intake air temperature is greater than or equal to the first threshold temperature or less than or equal to the second threshold temperature, and the acquired vehicle speed is greater than or equal to the specified value, and the acquired operating signal of the wiper indicates the continuous operation of the wiper.

In this way, since it is determined that the specified high humidity condition is satisfied in the case that the signal indicating the continuous operation of the wiper is acquired, it is possible to determine whether or not the specified high humidity condition is satisfied with a simpler configuration.

According to a fourth aspect of the disclosure, the supercharging pressure control device for the internal combustion engine according to any one of the first to third aspects further includes a torque compensation part (ECU 20, step 308) that increases an intake air flow when the supercharging pressure reduction control is executed by increasing an opening of a throttle valve 13 more as compared with a case when the supercharging pressure reduction control is not executed to compensate for a decrease in a torque of the internal combustion engine resulting from a reduction in the supercharging pressure PB.

According to the configuration, when the supercharging pressure reduction control is executed, the torque compensation part increases the intake air flow by increasing the opening of the throttle valve as compared with the case when the supercharging pressure reduction control is not executed. As a result, it is possible to compensate for the decrease in the torque resulting from the reduction in the supercharging pressure caused by the execution of the supercharging pressure reduction control, and it is possible to suppress the deterioration in drivability and fuel efficiency.

Hereinafter, an exemplary embodiment of the disclosure will be described in detail with reference to the drawings. As shown in FIG. 1, an internal combustion engine (hereinafter referred to as "engine") 1 is a direct-injection engine having, for example, four cylinders 6 in series equipped in the vehicle, and directly injecting fuel into combustion chambers (not shown) of the cylinders 6. Each cylinder 6 is provided with a fuel injection valve 7, a spark plug 8, an intake valve and an exhaust valve (none of which is shown).

In addition, the engine 1 includes an intake passage 2, an exhaust passage 11, and a turbocharger 12 operating as a supercharger. The intake passage 2 is connected to a surge tank 4, and the surge tank 4 is connected to the combustion chamber of each cylinder 6 via an intake manifold 5. In the intake passage 2, from the upstream side, a compressor 123, which will be described later, of the turbocharger 12, an intercooler 3 for cooling the air pressurized by the turbocharger 12, and a throttle valve 13 are provided. The throttle valve 13 is driven by a throttle (TH) actuator 13a. In the surge tank 4, a supercharging pressure sensor 21 detecting a supercharging pressure PB is provided; in the intake passage 2, an intake air flow sensor 22 detecting an intake air flow rate GAIR is provided, and an intake air temperature sensor 23 detecting an intake air temperature TI is also provided.

The turbocharger 12 includes a turbine 121 provided in the exhaust passage 11 and rotationally driven by the kinetic energy of the exhaust gas, and the compressor 123 provided in the intake passage 2 and connected to the turbine 121 via a shaft 122. The compressor 123 pressurizes the air (intake air) sucked into the engine 1 and supercharges it. The intake passage 2 is connected to a bypass passage 16 bypassing the compressor 123, and in the bypass passage 16, an air bypass valve (AB valve) 17 adjusting the air flow rate that passes through the bypass passage 16 is provided.

The exhaust passage 11 is connected to the combustion chamber of each cylinder 6 via an exhaust manifold 10. The exhaust passage 11 is connected to a bypass passage 14 bypassing the turbine 121. In the connection portion on the downstream side of the bypass passage 14, a wastegate valve (hereinafter referred to as "WG valve") 15 adjusting the flow rate of the exhaust gas that passes through the bypass passage 11 is provided. The WG valve 15 is controlled to open in the case that the supercharging pressure PB rises due to the supercharging performed by the turbocharger 12, and accordingly, the exhaust pressure (exhaust pressure on the upstream side of the turbine 121) becomes greater than or equal to a specified value. As a result, by releasing the exhaust pressure to the downstream side of the turbine 121 via the bypass passage 11, the supercharging pressure is adjusted. In the WG valve 15, a valve opening sensor 24 detecting an opening WGA of the WG valve 15 is provided.

Figure 2:
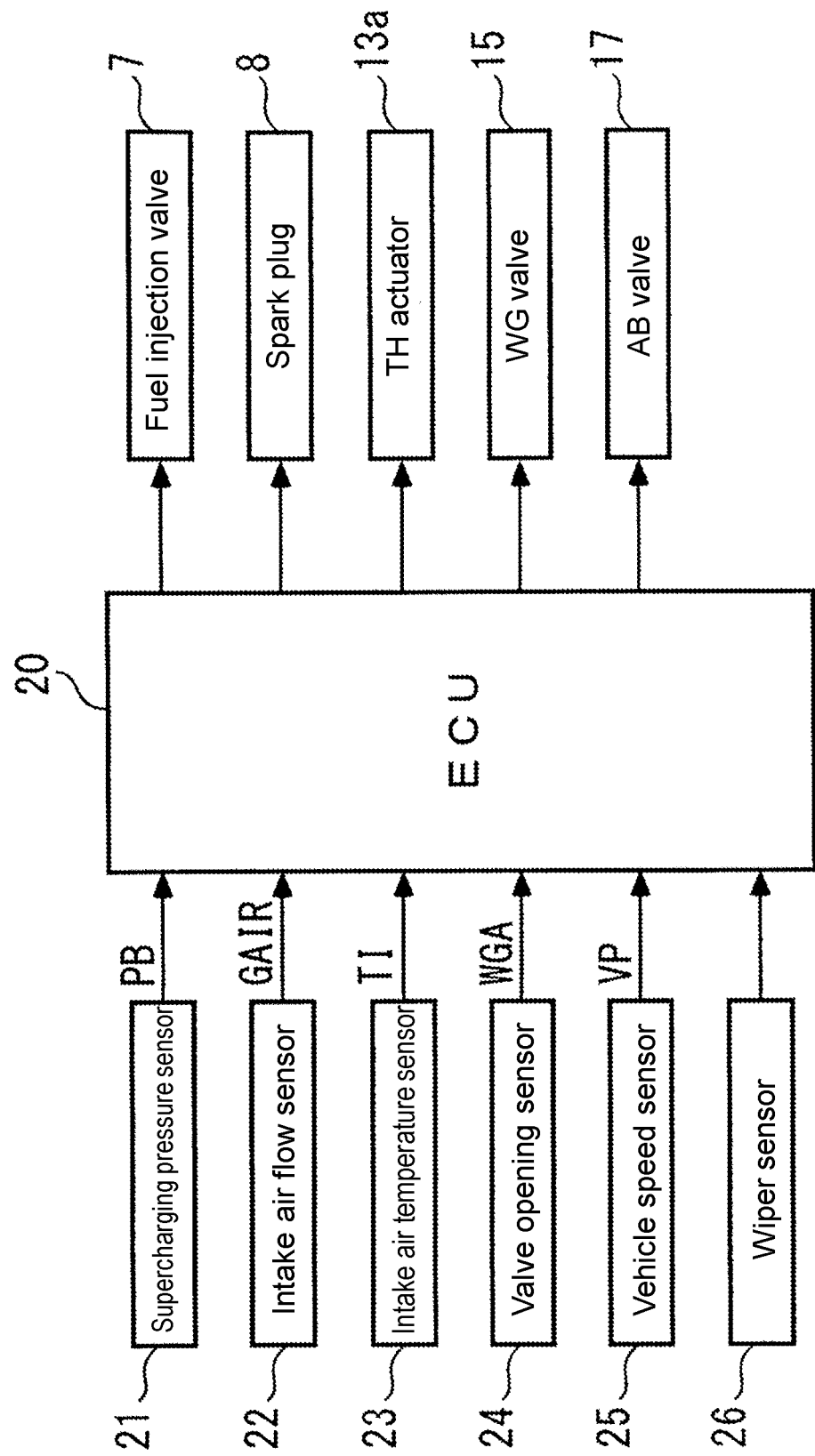
FIG. 2 is a block diagram showing a configuration of a control device for an internal combustion engine.

FIG. 2 shows a configuration of a control device for the engine 1. An electronic control unit (hereinafter referred to as ECU) 20 is composed of a microcomputer including a CPU, a RAM, a ROM, and an I/O interface (none of which is shown). The ECU 20 is connected to a vehicle speed sensor 25 detecting the speed of the vehicle, a wiper sensor 26 detecting the operating state of the wiper, and the like in addition to the supercharging pressure sensor 21, the intake air flow sensor 22, the intake air temperature sensor 23, and the valve opening sensor 24 described above. The detection signals of those sensors are sequentially input into the ECU 20. The output side of the ECU 20 is connected to the fuel injection valve 7, the spark plug 8, the TH actuator 13a, the WG valve 15, the AB valve 17, and the like.

Figure 3:
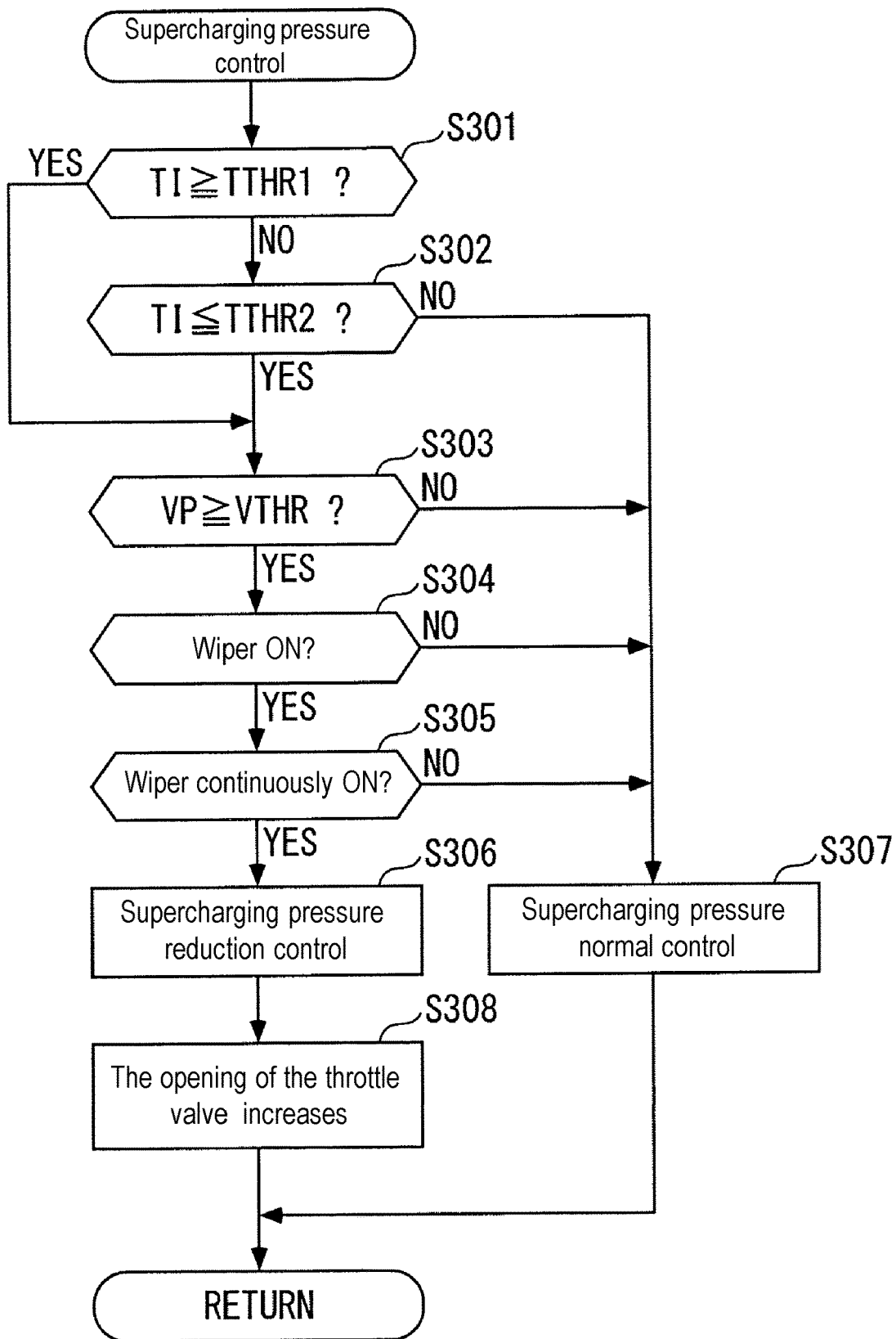
FIG. 3 is a flowchart showing a supercharging pressure control processing.

FIG. 3 is a flowchart showing a supercharging pressure control processing according to the embodiment. This processing is repeatedly executed in the ECU 20 at specified intervals.

Regarding the processing, first, in step 301 (shown as "S301", hereinafter the same shall apply), it is determined whether or not the intake air temperature TI detected by the intake air temperature sensor 23 is greater than or equal to a specified first threshold temperature TTHR1. The first threshold temperature TTHR1 is set to a high temperature that the amount of saturated water vapor is relatively large in the intake air and a large amount of moisture is contained. For example, a temperature corresponding to the outside temperature near the road surface in summer may be set as the first threshold temperature TTHR1. In the case that the result of the determination is YES and the intake air temperature TI is greater than or equal to the first threshold temperature TTHR1, the processing proceeds to step 303. In the case that the result of the determination is NO and the intake air temperature TI is less than the first threshold temperature TTHR1, the processing proceeds to step 302.

In step 302, it is determined whether or not the intake air temperature TI is less than or equal to a specified second threshold temperature TTHR2. The second threshold temperature TTHR2 is set to a low temperature that freezing of water is likely to occur. For example, a temperature corresponding to the outside temperature near the road surface in winter may be set as the second threshold temperature TTHR2. In the case that the result of the determination is YES and the intake air temperature TI is less than or equal to the second threshold temperature TTHR2, the processing proceeds to step 303. In the case that the result of the determination is NO and the intake air temperature TI is greater than the second threshold temperature TTHR2, the processing proceeds to step 307.

In step 303, it is determined whether or not the vehicle speed VP detected by the vehicle speed sensor 25 is greater than or equal to a specified threshold speed VTHR. The threshold speed VTHR is, in the case that the vehicle travels at this speed, set to a speed that the cooling of the intake air performed in the intercooler 3 is facilitated by the traveling wind and the occurrence of condensed water is facilitated. For example, a speed corresponding to the traveling speed of the vehicle on the highway may be set as the threshold speed VP. In the case that the result of the determination is YES and the vehicle speed VP is greater than or equal to the threshold speed VTHR, the processing proceeds to step 304. In the case that the result of the determination is NO and the vehicle speed VP is less than the threshold speed VTHR, the processing proceeds to step 307.

In step 304, it is determined whether or not a signal indicating that the wiper is operating has been input from the wiper sensor 26. In the case that the result of the determination is YES, the processing proceeds to step 305, and in the case that the result of the determination is NO, it proceeds to step 307. In step 305, it is determined whether or not a signal indicating that the wiper is continuously operating has been input from the wiper sensor 26. In the case that the result of the determination is YES, the processing proceeds to step 306, and in the case that the result of the determination is NO, it proceeds to step 307.

In step 306, according to the results of the determinations in steps 301 to 305 described above, when all the specified temperature conditions, the specified vehicle speed conditions, and the specified humidity conditions are satisfied, it is determined that a large amount of condensed water is likely to occur, and a supercharging pressure reduction control is executed. The supercharging pressure reduction control reduces the supercharging pressure PB to a value less than a target supercharging pressure PBCMD that is set based on the vehicle requirements by controlling the opening WGA of the WG valve 15 to the open side.

In step 308 following step 306, in order to compensate for the torque of the engine 1 that has decreased due to the execution of the supercharging pressure reduction control in step 306, the intake air flow is increased by controlling the TH actuator 13a in such a way that the opening of the throttle valve 13 increases more as compared with the case when the supercharging pressure reduction control is not executed.

On the other hand, in step 307, when one of the specified temperature conditions, the specified vehicle speed conditions, and the specified humidity conditions is not satisfied, it is determined that a large amount of condensed water is unlikely to occur, and a normal control is executed, yet the supercharging pressure reduction control is not performed. For the normal control, for example, the supercharging pressure PB is feedback controlled to become the target supercharging pressure PBCMD.

Moreover, in the embodiment, since the operating state of the wiper has a correlation with the rainfall condition, the operating state of the wiper is used as a parameter indicating the humidity of the intake air on the upstream side of the compressor 123. That is, the operating state of the wiper is confirmed in steps 304 and 305, and based on the fact that the wiper is continuously operating, it is evaluated that the humidity of the intake air on the upstream side of the compressor 123 is greater than or equal to a specified value.

As described above, according to the embodiment, in the case that the intake air temperature TI is greater than or equal to the first threshold temperature TTHR1 indicating the specified high temperature state, or is less than or equal to the second threshold temperature TTHR2 indicating the specified low temperature state, and the vehicle speed VP is greater than or equal to the threshold speed VTHR, and the wiper is continuously operating, the supercharging pressure reduction control is executed.

Therefore, only in the case that the specified high or low temperature conditions, the specified high vehicle speed conditions, and the specified high humidity conditions are satisfied, is the supercharging pressure PB reduced to a value less than the target supercharging pressure PBCMD, and by the reduction in the intake air flow rate resulting from supercharging, misfires of the internal combustion engine caused by the suction of a large amount of condensed water and freezing of the intercooler caused by excessive cooling may be suppressed. In addition, in the case that one of the above-mentioned specified temperature conditions, vehicle speed conditions, and humidity conditions is not satisfied, since the execution of the supercharging pressure reduction control is prohibited and the normal control is executed, it is possible to prevent the decrease in supercharging response under the conditions that a large amount of condensed water is unlikely to occur.

In addition, when the supercharging pressure reduction control is executed, since the opening of the throttle valve 13 is increased more as compared with the case when the supercharging pressure reduction control is not executed and the intake air flow is increased to compensate for the decrease in the torque of the engine 1 caused by the reduction in the supercharging pressure PB, the decrease in the torque caused by the reduction in the supercharging pressure PB resulting from the execution of the supercharging pressure reduction control may be compensated, and the deterioration of drivability and fuel efficiency may be suppressed.

Moreover, the disclosure is not limited to the described embodiment, and may be implemented in various embodiments. For example, in the embodiment, the intake air temperature on the upstream side of the compressor is acquired by the intake air temperature sensor; however, an outside temperature of the vehicle may be acquired by an outside temperature sensor and used as the intake air temperature.

In addition, in the embodiment, a signal indicating the operating state of the wiper detected by the wiper sensor is used as the parameter indicating the humidity of the intake air on the upstream side of the compressor; however, alternatively or additionally, a signal from a rain sensor detecting raindrops or a signal indicating an operation of a fog lamp may be used. Of course, it is also possible to detect the humidity of intake air with a humidity sensor or the like, and use that signal.

In addition, for torque compensation during supercharging pressure reduction control, in the embodiment, it is configured to increase the opening of the throttle valve; however, alternatively or additionally, the amount of fuel injection generated by the fuel injection valve may be increased. Besides, it is possible to appropriately modify the detailed configuration within the scope of the gist of the disclosure.

What is claimed is:

1. A supercharging pressure control device for an internal combustion engine, comprising:
a supercharger, configured to compress an intake air of the internal combustion engine equipped in a vehicle by a compressor, and perform supercharging;
an intercooler, configured to cool the intake air compressed by the compressor;
a supercharging pressure control part, configured to control a supercharging pressure generated by the supercharger based on a target supercharging pressure that is set based on a requirement of the vehicle; and
an intake air temperature acquisition part, configured to acquire a temperature of the intake air on an upstream side of the compressor as an intake air temperature,
wherein the supercharging pressure control part is configured to:
execute a supercharging pressure reduction control that reduces the supercharging pressure to a value less than the target supercharging pressure, when the acquired intake air temperature is greater than or equal to a specified first threshold temperature or less than or equal to a specified second threshold temperature that is less than the first threshold temperature, and
prohibit an execution of the supercharging pressure reduction control, when the intake air temperature is less than the first threshold temperature and greater than the second threshold temperature.

2. The supercharging pressure control device for the internal combustion engine according to claim 1, further comprising:
a vehicle speed acquisition part, configured to acquire a vehicle speed that is a speed of the vehicle; and
an intake air humidity parameter acquisition part, configured to acquire an intake air humidity parameter indicating a humidity of the intake air on the upstream side of the compressor,
wherein the supercharging pressure control part is configured to:
execute the supercharging pressure reduction control, when the intake air temperature is greater than or equal to the first threshold temperature or less than or equal to the second threshold temperature, the acquired vehicle speed is greater than or equal to a specified value, and the humidity indicated by the acquired intake air humidity parameter is greater than or equal to a specified value, and
prohibit the execution of the supercharging pressure reduction control, when the intake air temperature is less than the first threshold temperature and greater than the second threshold temperature, or the vehicle speed is less than the specified value, or the humidity indicated by the intake air humidity parameter is less than the specified value.

3. The supercharging pressure control device for the internal combustion engine according to claim 2, wherein
the intake air humidity parameter is an operating signal of a wiper, and
the supercharging pressure control part is configured to:
execute the supercharging pressure reduction control, when the intake air temperature is greater than or equal to the first threshold temperature or less than or equal to the second threshold temperature, the acquired vehicle speed is greater than or equal to the specified value, and the acquired operating signal of the wiper indicates a continuous operation of the wiper, and
prohibit the execution of the supercharging pressure reduction control, when the intake air temperature is less than the first threshold temperature and greater than the second threshold temperature, or the vehicle speed is less than the specified value, or the acquired operating signal of the wiper does not indicate the continuous operation of the wiper.

4. The supercharging pressure control device for the internal combustion engine according to claim 1, further comprising:
a torque compensation part, configured to increase an intake air flow, when the supercharging pressure reduction control is executed by increasing an opening of a throttle valve more as compared with a case when the supercharging pressure reduction control is not executed to compensate for a decrease in a torque of the internal combustion engine resulting from a reduction in the supercharging pressure.

5. The supercharging pressure control device for the internal combustion engine according to claim 2, further comprising:
a torque compensation part, configured to increase an intake air flow, when the supercharging pressure reduction control is executed by increasing an opening of a throttle valve more as compared with a case when the supercharging pressure reduction control is not executed to compensate for a decrease in a torque of the internal combustion engine resulting from a reduction in the supercharging pressure.

6. The supercharging pressure control device for the internal combustion engine according to claim 3, further comprising:
a torque compensation part, configured to increase an intake air flow, when the supercharging pressure reduction control is executed by increasing an opening of a throttle valve more as compared with a case when the supercharging pressure reduction control is not executed to compensate for a decrease in a torque of the internal combustion engine resulting from a reduction in the supercharging pressure.

\* \* \* \* \*